United States Patent [19]

Schulte

[11] Patent Number: 5,357,700
[45] Date of Patent: Oct. 25, 1994

[54] ANIMAL IDENTIFICATION DEVICE WITH OUTER CARRIER MOLDED AROUND INTERNAL CAPSULE

[75] Inventor: Klaus Schulte, Mölnbo, Sweden

[73] Assignee: Alfa-Laval Agriculture International AB, Tumba, Sweden

[21] Appl. No.: 965,281

[22] PCT Filed: Jul. 4, 1991

[86] PCT No.: PCT/SE91/00476

§ 371 Date: Jan. 22, 1993

§ 102(e) Date: Jan. 22, 1993

[87] PCT Pub. No.: WO92/02127

PCT Pub. Date: Feb. 20, 1992

[30] Foreign Application Priority Data

Aug. 7, 1990 [SE] Sweden .................. 9002591-7

[51] Int. Cl.⁵ .................................................. A01K 11/00
[52] U.S. Cl. .................................. 40/301; 40/300; 606/117
[58] Field of Search .................. 606/116, 117; 40/300–304; 342/42; D30/155

[56] References Cited

U.S. PATENT DOCUMENTS

| | | |
|---|---|---|
| 2,653,401 | 9/1953 | Sutherland . |
| 2,794,277 | 6/1957 | Dryden . |
| 3,785,337 | 1/1974 | Flowerday . |
| 3,949,708 | 4/1976 | Meeks . |
| 4,353,225 | 10/1982 | Rogers . |
| 4,425,874 | 1/1984 | Child . |
| 4,428,327 | 1/1984 | Steckel . |
| 4,506,630 | 3/1985 | Hair . |
| 4,612,877 | 9/1986 | Hayes et al. . |
| 4,694,781 | 9/1987 | Howe et al. . |
| 4,697,549 | 10/1987 | Hair . |
| 4,718,697 | 1/1988 | van Amerlsfort . |
| 4,774,503 | 9/1988 | Bussard . |
| 5,002,548 | 3/1991 | Campbell et al. ............ 606/116 |
| 5,192,285 | 3/1993 | Bolscher .................. 606/116 |

FOREIGN PATENT DOCUMENTS

| | | |
|---|---|---|
| 0219186 | 11/1986 | European Pat. Off. . |
| 8802209 | 9/1988 | Netherlands ............ 606/116 |
| 9006050 | 6/1990 | World Int. Prop. O. ....... 606/116 |

Primary Examiner—Stephen C. Pellegrino
Assistant Examiner—Glenn Dawson
Attorney, Agent, or Firm—Hovey, Williams, Timmons & Collins

[57] ABSTRACT

In an identification device, which is arranged to be fastened on an animal, a signal device operative for identification purposes is placed in a cavity of a hard capsule which in turn is surrounded by a soft carrier material. By the soft carrier material the identification device is flexible in an area between the capsule, and the part of the identification device which is to be fastened to the animal. The soft carrier material is molded around the capsule, which is formed in one piece around the cavity and has an opening for the introduction of the signal device into the cavity.

8 Claims, 1 Drawing Sheet

ANIMAL IDENTIFICATION DEVICE WITH OUTER CARRIER MOLDED AROUND INTERNAL CAPSULE

BACKGROUND OF THE INVENTION

1. Field of the Invention

The present invention concerns an identification device arranged to be fastened on an animal, e.g. a pig, and comprising a carrier made of a relatively soft material and a capsule carried by the carrier and made of a relatively hard material, the capsule having an inner cavity formed to contain signal means arranged to cooperate wirelessly with a sensing equipment situated at a distance from the animal.

2. Description of the Prior Art

A previously known identification device of this kind, shown in FIG. 6 of EP-A1 0219 186, comprises a two-piece hard capsule, in which signal means can be placed, and a soft carrier arranged to enclose the capsule. The shown carrier is formed such that two parts of it are to be connected with each other after the signal means has been placed within the capsule and the capsule has been placed in a particular space that is formed between the carrier parts when put together.

The previously known identification device has a construction that is disadvantageous in severals respects. Thus, the carrier has a relatively complicated shape due to the fact that two parts thereof are later to be connected with each other. Further, so that the carrier shall be able to resist safely those forces to which it may be subjected when fastened on an animal, e.g. forces caused by biting of other animals, it is necessary that the connection of the different carrier parts be performed in a qualified manner. Both of these circumstances make the previously known identification device expensive to manufacture. If, as is proposed in EP-A1 0219 186, the two carrier parts are heat sealed together, it will then be impossible in practice to exchange the encased signal means if required.

One object of the present invention is to provide a construction for an identification device of the initially defined kind, which enables a very cheap production of such identification devices and which makes the identification devices very resistant to the forces to which they may be subjected when used.

Another object of the invention is that a construction improved in this manner should enable a substantially complete finishing of the capsule as well as the carrier before the signal means is placed in the capsule, the finalizing production moment, i.e. arrangement of the signal means in the capsule, being performable in a simple and cheap manner and the final product, in spite of this, being able to resist the forces to which it may be subjected when used.

A further object of the invention is that an improved construction of the identification device should enable exchange of the signal means relatively easily if required.

SUMMARY OF THE INVENTION

For the fulfilling of these objects it is proposed according to the invention that an identification device of the initially defined kind is formed such that the soft carrier material is molded around the capsule and the capsule is formed in one piece around said cavity and has an opening for the introduction of said signal means in the cavity.

Hereby, the capsule may be given the largest possible strength, and its opening for the introduction of the signal means may easily be closed when the signal means is in place. Further, the carrier may be molded, e.g. injection molded, around the capsule while said opening of the capsule is kept free from carrier material by means of a pin or other suitable filling member, which when removed leaves an opening also in the carrier, aligned with the opening in the capsule.

Only the opening in the carrier need be closed later on, which can be performed in an easy way by means of a plug which possibly may be melted together with the carrier material around the opening.

In a preferred embodiment of the invention the capsule is elongated, the insertion opening for the signal means being situated at one of the ends of the capsule. The carrier material, preferably a plastic, preferably forms a thin layer around substantially the whole of the capsule.

An identification device according to the invention may be fastened for instance to an ear of a pig. Then a first part of the carrier is formed to be fastened on the pig and a second part of the carrier surrounds the said capsule. A third part of the carrier situated between the two first said carrier parts should be formed so that it is flexible. Thanks to such a flexibility and the soft material of the carrier the risk is minimal for the pig to be injured. It is further prevented, thanks to the hard capsule, that the fragile signal means therein is destroyed by biting by other pigs. By the fact that the soft material surrounds essentially the whole of the capsule the latter may be carried by the carrier without use of special fastening means, such as rivets or the like.

By giving substantially the whole outside surface of the capsule a convex form, for instance so that the capsule gets the form of an egg, one can make it even more difficult to destroy the capsule by biting. The capsule thereby can be given the smallest possible dimensions with regard to the size of the sensible signal means which it is to contain.

DETAILED DESCRIPTION OF THE DRAWINGS

Figure 2:
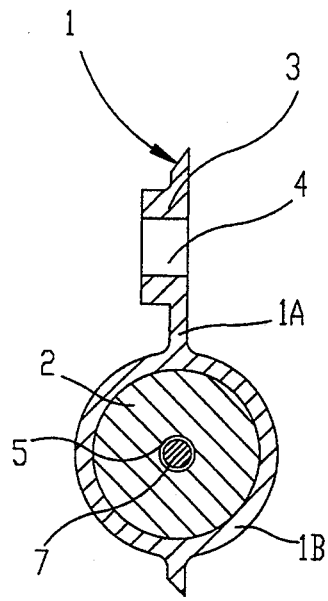
FIG. 2 is a cross sectional view taken along line II—II of FIG. 1.
Figure 1:
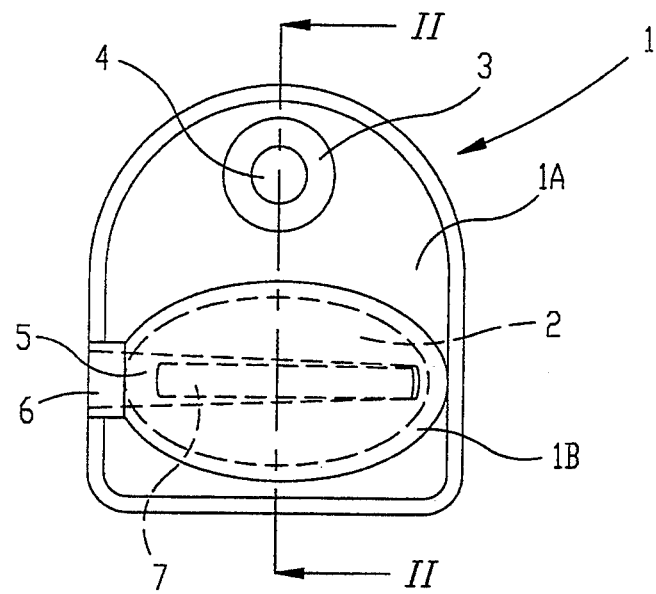
FIG. 1 is a front elevational view of the Animal Identification Device according to the present invention, with portions of a cavity and signal device shown in phantom.

FIGS. 1 and 2 show an identification device intended to be fastened to the ear of an animal, such as a pig or a cow. The identification device has a carrier 1 of a relatively soft material, for instance some elastic thermoplast, and a capsule 2 substantially completely surrounded by said material and made of a relatively hard material, for instance some glas fibre reinforced thermoset plastic.

The carrier 1 comprises a first plate formed plane part 1A and a second part 1B surrounding the capsule 2 by a layer of material having about the same thickness as the plate formed plane part 1A. This is illustrated in FIG. 1 by a dotted ellipse. The different parts of the carrier are formed in one piece by molding, e.g. injection molding, around the capsule 2.

For its fastening on to an animal the plate formed plane part of the carrier has an annular thicker portion 3 with a through hole 4. The capsule 2 being formed like an egg has a central cavity 5. The cavity 5 extends along the longitudinal axis of the capsule (illustrated in FIG. 1 by dotted lines) and has a slightly conical shape. At its widest end the cavity communicates with an opening 6 in the surrounding carrier material, which opening communicates with the surrounding atmosphere.

A cylindrical signal means 7 constituting the operative part of the identification device has been inserted into the cavity 5 through the opening 6. The signal means 7 that may comprise electronic components of various kinds intended for signal communication with a sensing equipment arranged at a distance from the identification device is very sensitive and has to be well protected both mechanically and otherwise. After the signal means 7 has been inserted into the cavity 5 the opening 6 may be provided with a closing plug (not shown) or be closed in a different manner, e.g. by heating and deformation of the carrier material.

The identification device according to the invention may be made ready for use without risk of destruction of the sensitive signal means 7. Thus, the capsule 2 with its cavity 5 may first be made without the signal means 7 having to be in place at this stage. The capsule thus need not be molded around the signal means 7, which might jeopardize the later function of the signal means 7. After this the carrier material may be molded around the capsule while this is fixed in a mould by means of a special holder extending into the cavity 5 of the capsule. The holder then will form the opening 6 during the moulding of the carrier. Finally, as already explained, the signal means 5 may be introduced into the capsule and the opening 6 be closed.

Also when used i.e. when the identification device is fastened to an animal, the sensitive signal means 7 is protected from mechanical destruction, for instance by biting of other animals. The described shape of the capsule makes it very resistant to damages by biting.

The plate formed plane part 1A of the carrier is flexible so that the carrier part 1B which surrounds the capsule 2 has a certain movability in relation to the thicker portion 3 of the carrier, by means of which the identification device is fastened to the animal. This reduces the risk for damages on the animal during use of the identification device. Of course, the part of the identification device by means of which it is to be fastened to an animal may be formed in any suitable way.

Figure 3:
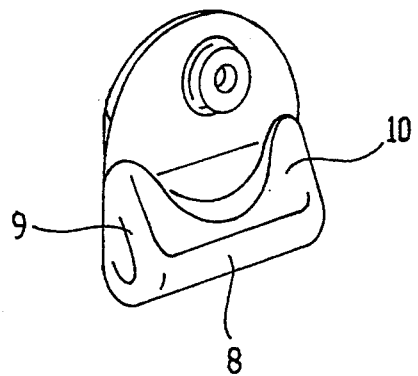
FIG. 3 is a perspective view of an alternate embodiment of the identification device hereof.

FIG. 3 shows an alternative embodiment of an identification device according to the invention. A capsule containing signal means is surrounded by carrier material at 8. The capsule is elongated and has at its ends members protruding laterally and also surrounded by carrier material at 9 and 10. A hole (not shown), through which the signal means has been inserted into the embedded capsule at one of its ends, has been closed by melting of carrier material around the hole.

I claim:

1. An identification device adapted for attachment to an animal comprising:
   a carrier made in one piece of a relatively soft material and having a first part adapted to be attached to the animal, a second part formed for enclosing a signal means for wireless cooperation with sensing equipment situated at a distance from the animal and a third part interconnecting said first and second parts and formed to provide flexibility in the connection between the first and second parts; and
   a capsule carried by said second part of the carrier and made of a relatively hard material, said capsule having an inner cavity formed for receiving the signal means, said soft carrier material being molded around said capsule and the capsule being formed in one piece and having an opening communicating with said inner cavity for the introduction of said signal means into said inner cavity.

2. An identification device as set forth in claim 1, wherein the capsule is elongated with opposing ends, said opening being situated at one of said ends.

3. An identification device as set forth in claim 1, wherein said soft carrier material forms a thin layer substantially around the entire capsule.

4. An identification device as set forth in claim 1, wherein said carrier material is constituted of plastic.

5. An identification device as set forth in claim 1, wherein said soft carrier material is formed as a thin layer around the capsule, having only one opening adjacent at the opening of said capsule, said cavity of the capsule communicating with the atmosphere around the identification device via the opening of the capsule and the opening of said thin layer of said soft carrier material.

6. An identification device as set forth in claim 5, wherein the capsule is elongated with opposing ends, said opening of the capsule being situated at one of said ends.

7. An identification devise as set forth in claim 6, wherein said thin layer is formed around substantially the entire capsule.

8. An identification device as set forth in claim 5 and further comprising signal means in said inner cavity of said capsule and plug means in said opening of said soft carrier material for preventing the signal means from leaving the capsule.

* * * * *